United States Patent [19]

Fischer

[11] Patent Number: 4,801,662
[45] Date of Patent: Jan. 31, 1989

[54] MONOISOCYANATE CAPPED EPOXY RESINS

[75] Inventor: Gordon C. Fischer, Angleton, Tex.

[73] Assignee: The Dow Chemical Company, Midland, Mich.

[21] Appl. No.: 90,486

[22] Filed: Aug. 28, 1987

[51] Int. Cl.$^4$ .............................................. C08G 59/14
[52] U.S. Cl. .................................... 525/504; 525/113; 525/438; 525/510; 528/69; 528/73; 528/99
[58] Field of Search ............... 525/504, 528, 438, 113, 525/510; 528/69, 73, 99

[56] References Cited

U.S. PATENT DOCUMENTS 3,525,779  8/1970  Hawkins .............................. 260/830
4,163,096  7/1979  Seiz et al. ............................... 528/69
4,609,706  9/1986  Bode et al. ....................... 525/528 X

OTHER PUBLICATIONS

"Hydroxyl-Modified Epoxy Resins: Some Technical and Analytical Aspects" by B. Dobinson et al., *Makromol. Chem.*, 181, No. 1, pp. 1-17, Jan. 1980.

*Primary Examiner*—Earl Nielsen

[57] ABSTRACT

Solid epoxy resins having low melt viscosity and high softening points are prepared by partially reacting the aliphatic secondary hydroxyl groups with a monoisocyanate to form pendant urethane groups. These resins are particularly useful as binders in preparing high flowout, non-sintering powder paints.

25 Claims, No Drawings

MONOISOCYANATE CAPPED EPOXY RESINS

FIELD OF THE INVENTION

The present invention pertains to modified epoxy resins and their use in coating compositions.

BACKGROUND OF THE INVENTION

Powder coatings are increasingly becoming an important segment of the coatings industry. They offer a wide range of advantages over conventional solvent borne coatings which include no volatile organic compounds, 95–98% recovery of over-sprayed powder, superior corrosion and chemical resistance, and the like. One major disadvantage, however, particularly for polyester/epoxy hybrid decorative coatings, is their lack of flow-out during cure and the resulting uneven or "orange-peel" appearance. This poor appearance is caused predominantly by the high melt viscosity of the carboxy functional polyester resin and the unsatisfactorily high melt viscosity of the epoxy resin used to cure the polyester resin. There are several solid epoxy resins which have low melt viscosities, such as D.E.R. TM 661 and D.E.R. TM 662 solid epoxy resins available from The Dow Chemical Company and EPON TM 1001 and EPON TM 1002 solid epoxy resins available from Shell Chemical Company. These resins can conceivably be used for powder coatings to provide smooth finishes. However, because of their low softening points, they are found to not be stable upon prolonged periods of storage at ambient temperatures. If stored for long periods of time, the resin flakes or chips tend to clump together (sinter) rendering them unusable until mechanically broken apart. Because of the inherent storage problem associated with low melt viscosity epoxy resins, it would be desirable to have available epoxy resins which not only have very low melt viscosities, but also have adequate storage stability as evidenced by their high softening points. These resins would advantageously provide high flow-out and consequently impart very smooth finishes without the need for special resin storage facilities. The coatings industry considers epoxy resins which have Mettler softening points of about 90° C. and above to be storage stable whereas those having Mettler softening points below about 85° C. require refrigerated storage. Those resins having Mettler softening between 85° C. and 90° C. may or may not require special storage facilities.

SUMMARY OF THE INVENTION

The present invention pertains to an improvement in epoxy resins which have secondary aliphatic hydroxyl groups along their backbone; wherein the improvement resides in reacting at least a portion of the secondary aliphatic backbone hydroxyl groups with (a) an aliphatic monoisocyanate, (b) an aliphtic monoisothiocyanate (c) an aromatic monoisocyanate, (d) an aromatic monoisothiocyanate or (e) any combination thereof.

The present invention also pertains to curable compositions containing the aforementioned isocyanate modified epoxy resins and a curing quantity of a curing agent therefor.

The present invention also pertains to coating compositions containing the aforementioned isocyanate modified epoxy resins.

The present invention therefore provides for solid epoxy resins which have low melt viscosities and high softening points.

DETAILED DESCRIPTION OF THE INVENTION

The epoxy resins having secondary aliphatic hydroxyl groups along their backbone can be purchased commercially from several sources, eg The Dow Chemical Company, Shell Chemical Company or Ciba-Geigy Corp., to name a few. If desired, these resins can conveniently be prepared by reacting a relatively low molecular weight epoxy resin with an organic compound having an average of about 2 aromatic hydroxyl groups per molecule, hereafter referred to as a dihydric phenol, in the presence of a suitable advancement catalyst at temperatures of from about 50° C. to about 250° C., suitably from about 100° C. to about 200° C. more suitably from about 150° C. to about 175° C. for a period of time to essentially complete the advancement reaction, suitably from about 1 to about 24, more suitably from about 2 to about 6, most suitably from about 3 to about 4 hours. The epoxy resin and the organic compound having an average of about 2 aromatic hydroxyl groups per molecule are reacted in amounts which provide a ratio of aromatic hydroxyl groups to epoxy groups of from about 0.1:1 to about 0.9:1, suitably from about 0.3:1 to about 0.7:1, more suitably from about 0.4:1 to about 0.6:1.

Any epoxy resin having an average of more than one vicinal epoxy group per molecule can be employed to react with the dihydric phenol to form an epoxy resin having a sufficient quantity of aliphatic secondary hydroxyl groups to be useful for powder coatings can be employed herein. Particularly suitable are those epoxy resins having the following Formulas I, II, III and IV:

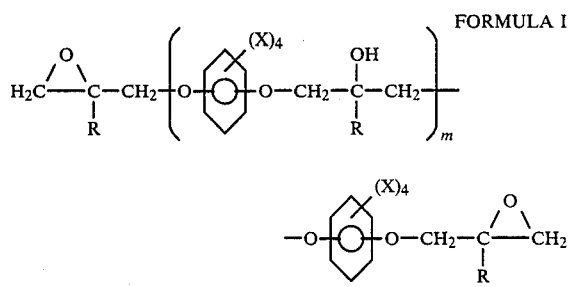

FORMULA III

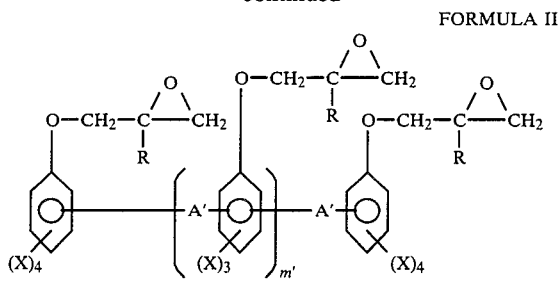

FORMULA IV

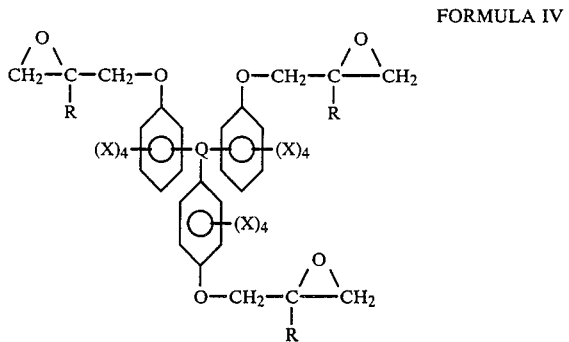

wherein each A is independently a divalent hydrocarbon group having from 1 to about 10, preferably from 1 to about 6, carbon atoms, —O—, —S—, —S—S—, —SO—, —SO$_2$— or —CO—; Q is a trivalent hydrocarbon group having from 1 to about 10 carbon atoms; each A' is independently hydrogen or a hydrocarbon group having from 1 to about 10, preferably from about 1 to about 4, carbon atoms; each R is independently hydrogen or an alkyl group having from 1 to about 4 carbon atoms; each X is independently hydrogen, a hydrocarbyl or hydrocarbyloxy group having from 1 to about 10, preferably from 1 to about 4 carbon atoms, bromine, chlorine or fluorine; m has an average value of from zero to about 2; m' has an average value from about 0.001 to about 5, preferably from about 0.001 to about 3; and n has a value of zero or 1.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the object to which it is attached.

Suitable dihydric phenols which can be employed herein to prepare epoxy resins having secondary aliphatic hydroxyl groups along its backbone include those represented by the following formulas V and VI:

FORMULA V

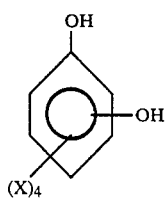

FORMULA VI

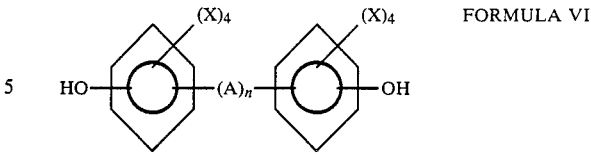

wherein each A, X and n is as defined above.

Suitable catalysts for reacting the epoxy resin with the dihydric phenol include any acid or base (Lewis, Bronsted-Lowery type, nitrogen-, phosphorus-, oxygen-, or sulfur-containing bases such as tertiary amines; primary, secondary or tertiary phosphines; metal salts of alcohols, phenols, carboxylic acids or water; thioethers and the like) or any compound which will catalyze the reaction between an epoxy group and a phenolic hydroxyl group such as, for example, imidazoles, tertiary amines, quaternary ammonium compounds, phosphonium compounds, phosphines, combinations thereof and the like. Suitable imidazoles include, for example, 2-methylimidazole, 2-ethyl-4-methylimidazole, 2-ethylimidazole, 1-methylimidazole, 1-propylimidazole, 2-phenylimidazole, combinations thereof and the like. Suitable tertiary amines include, for example, N,N-dimethylbenzylamine, N,N-dimethylaniline, triethylamine, tripropylamine, triphenylamine, combinations thereof and the like. Suitable quaternary ammonium catalysts which can be employed herein include, for example, benzyl trimethyl ammonium chloride, benzyl trimethyl ammonium bromide, tetrabutyl ammonium chloride, combinations thereof and the like. Particularly suitable phosphonium compounds include, for example, ethyltriphenyl phosphonium chloride, ethyltriphenyl phosphonium bromide, ethyltriphenyl phosphonium iodide, ethyltriphenyl phosphonium acetate·acetic acid complex, tetrabutyl phosphonium chloride, tetrabutyl phosphonium bromide, tetrabutyl phosphonium iodide, tetrabutyl phosphonium acetate·acetic acid complex, combinations thereof and the like. Suitable such catalysts which can be employed herein include, for example, those disclosed in U.S. Pat. Nos. 3,306,872; 3,341,580; 3,379,684; 3,477,990; 3,547,881; 3,948,855; 4,048,141; 4,093,650; 4,131,633; 4,132,706; 4,171,420; 4,177,216; 4,302,574; 4,320,222; 4,366,295 and 4,389,520, all of which are incorporated herein by reference.

Instead of preparing the epoxy resin having secondary aliphatic hydroxyl groups in its backbone, one can just as well employ commercially available epoxy resins as mentioned above. These epoxy resins can have the formulas I and II described above wherein the value of m is from about 2 to about 15, more suitably from about 2 to about 10, most suitably from about 3 to about 6.

The reaction between the monoisocyanate-containing or monoisothiocyanate-containing compound and the epoxy resin having secondary aliphatic hydroxyl groups in its backbone can be conducted in the presence of a suitable catalyst for reacting an aliphatic hydroxyl group with an isocyanate or isothiocyanate group. The reaction is suitably conducted at a temperature of from about 50° C. to about 200° C., suitably from about 100° C. to about 175° C. more suitably from about 125° C. to about 150° C. for a period of time to essentially complete the condensation reaction, suitably from about 0.25 to about 4, more suitably from about 0.5 to about 3, most suitably from about 1 to about 2 hours. Higher temperatures require less reaction time than do lower temperatures. At temperatures above about 200° C., the isocyanate or isothiocyanate can become too volatile to remain in the reaction medium or undesirable molecular weight build can occur due to further reaction of the formed urethane group with epoxy groups on the polymer.

At temperatures below about 50° C., some isocyanates or isothocyanates are too slow to react with the secondary aliphatic hydroxyl groups. In addition, the epoxy resin may be too viscous in the absence of a solvent to allow for proper mixing.

Suitable catalysts for effecting the reaction between an aliphatic hydroxyl group and an isocyanate or isothiocyanate group include, for example tertiary amines, organometallic compounds, particularly metal carboxylates, mixtures thereof and the like. Particularly suitable catalysts include, for example, di-n-butyl tin-bis(-mercaptoacetic acid isooctyl ester), dimethyl tin dilaurate, dibutyl tin dilaurate, stannous octoate, triethylene diamine, N-methyl morpholine, combinations thereof and the like.

The monoisocyanate and/or monoisothiocyanate compound is employed in an amount which corresponds to the theoretical amount required to react with from about 8 to about 70, suitably from about 10 to about 50, more suitably from about 20 to about 30, percent of the secondary aliphatic hydroxyl groups theoretically present in the epoxy resin with which the monoisocyanate and/or monoisothiocyanate compound is to be reacted.

Suitable monoisocyanate compounds which can be employed herein include, for example, those represented by the following formulas VII, VIII or IX:

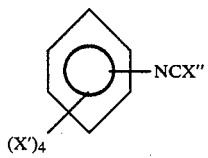

FORMULA VII

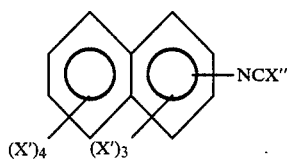

FORMULA VII

R'—NCX"   FORMULA IX wherein R' is an alkyl group having from 1 to about 20, preferably from about 3 to about 8 carbon atoms; each X' is independently hydrogen, a hydrocarbyl, hydrocarbyloxy, aminoalkyl or thioalkyl group having from 1 to about 10 carbon atoms, a nitro group, bromine, chlorine or fluorine and X" is an oxygen atom or a sulfur atom. Particularly suitable monoisocyanates and monoisothiocyanates include, for example, aliphatic and aromatic isocyanates and isothiocyanates such as phenyl isocyanate, isopropyl isocyanate, octadecyl isocyanate, naphthylisocyanate, tolueneisocyanate, methylisocyanate, ethylisocyanate, butyl isocyanate, phenyl isothiocyanate, isopropyl isothiocyanate, octadecyl isothiocyanate, naphthylisothiocyanate, tolueneisothiocyanate, methylisothiocyanate, ethylisothiocyanate, butyl isothiocyanate, combinations thereof and the like.

The modified epoxy resin compositions of the present invention can, if desired, be further modified by reacting all or some of the terminal epoxy groups with a monohydric phenol or thiophenol such as those represented by the following formula X

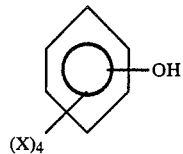

FORMULA X wherein each X is as defined above. Particularly suitable monohydric phenols include, for example, nonyl phenol, tertiary butyl phenol, phenol, o-cresol, m-cresol, p-cresol, esters of hydroxy benzoic acid, o-bromophenol, m-bromophenol, p-bromophenol, o-fluorophenol, m-fluorophenol, p-fluorophenol, nitrophenols, combinations thereof and the like. While modification of the terminal epoxy groups with the monohydric phenols do not add any particular benefit to epoxy/polyester hydbrid coatings prepared therefrom, it is not detrimental thereto. However, for applications where the modified epoxy resin is to be employed with an epoxy curing agent, one would not want to modify a substantial amount of the terminal epoxy groups because to do so would result in insufficient curing of the epoxy resin which would lead to poor properties in the cured product.

The modified epoxy resins resulting from reacting the aliphatic hydroxyl groups along its backbone can be represented by the following formulas XI and XII when the epoxy resin being modified is that represented by the aforementioned formulas I and II.

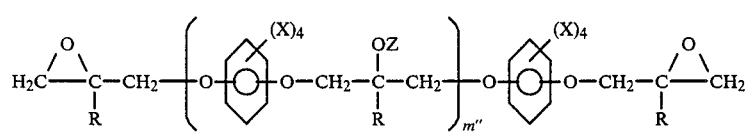

FORMULA XI

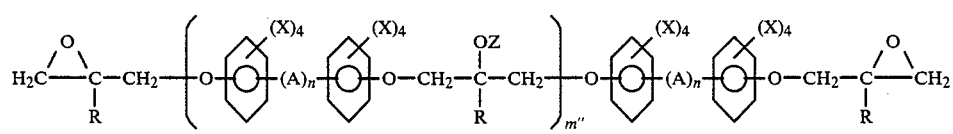

FORMULA XII wherein each R, X, and n are as previously defined; each Z is independently a hydrogen group or the group represented by the following formulas XIII, XIV and XV:

FORMULA XIII

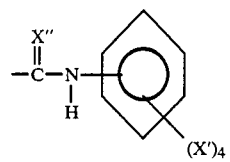

FORMULA XIV

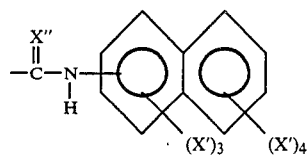

FORMULA XV

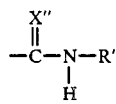

wherein each R' and X' is as previously defined and "m" has an average value from about 2 to about 15, suitably from about 2 to about 10, more suitably from about 3 to about 6.

The modified epoxy resins of the present invention can be cured with any suitable curing agent for epoxy resins including, for example, primary and secondary polyamines, carboxylic acids and anhydrides thereof, phenolic hydroxyl-containing compounds, guanidines, biguanides, urea-aldehyde resins, melamine-aldehyde resins, alkoxylated urea-aldehyde resins, alkoxylated melamine-aldehyde resins, polymercaptans, tertiary amines, aromatic polyamines such as methylenedianaline and diaminodiphenylsulfone, sulfanilamides, phosphates and partial esters thereof, phosphites, Lewis acids such as borontrifluoride and complexes thereof, combinations thereof and the like. Particularly suitable curing agents include, for example, dicyandiamide, phenolic compounds such as D.E.H 81, 82, 84 and 85 curing agents available from The Dow Chemical Company, imidazoles such as 2-methylimidazole and reaction products of 2-methylimidazole with liquid epoxy resins, trimellitic anhydride, pyromellitic dianhydride, phthalic anhydride, maleic anhydride, succinic anhydride, chlorendic anhydride, carboxy functinal polyester resins, combinations thereof and the like. The curing agents are employed in an amount which will effectively cure the composition containing the modified epoxy resin. These amounts will depend upon the particular modified epoxy resin and curing agent employed; however, suitably amounts include, for example, from about 0.1 to about 1.5, more suitably from about 0.5 to about 1.25, most suitably from about 0.75 to about 1 equivalent(s) of curing agent per equivalent of epoxy resin.

The modified epoxy resins of the present invention can be blended with other materials such as solvents or diluents, fillers, pigments, dyes, flow modifiers, thickeners, reinforcing agents, or other polymers such as unmodified epoxy resins, polyethylene, polystyrene, polypropylene, ethylene-acrylic acid copolymers, nylons, polyester resins, poly(vinyl chloride) or poly(vinylidene chloride) resins, combinations thereof and the like.

These additives, when employed are added in functional equivalent amounts eg. the pigments and/or dyes are added in quantities which will provide the composition with the desired color; however, they are suitably employed in amounts of from about 5 to about 70, suitably from about 10 to about 60, more suitably from about 30 to about 50 percent by weight based upon the weight of complete or total coating mixture.

Solvents or diluents which can be employed in coating applications other than powder coatings include, for example, hydrocarbons, ketones, glycol ethers, alcohols, ethers, combinations thereof and the like. Particularly suitable solvents or diluents include, for example, toluene, benzene, xylene, methyl ethyl ketone, methyl isobutyl ketone, diethylene glycol methyl ether, dipropyl glycol methyl ether, methanol, ethanol, propanol, isopropyl alcohol, sec-butyl alcohol, tert-butyl alcohol, ethyl ether, ethyl methyl ether, propyl ether, butyl ether, hexyl ether, combinations thereof and the like.

The modifiers such as thickeners, flow modifiers and the like can be suitably employed in amounts of from about 0.1 to about 5, suitably from about 0.5 to about 3, more suitably from about 0.75 to about 2 percent by weight based upon the weight of the total coating mixture.

The fillers, when employed, can be suitably employed in amounts of from about 5 to about 70, suitably from about 10 to about 60, more suitably from about 30 to about 50 percent by weight based upon the weight of the total coating mixture.

The following examples are illustrative of the invention and are not to be construed as to limiting the scope thereof in any manner.

EXAMPLES 1–8

General Procedure for Preparation of Phenyl Isocyanate Capped Resin

In a 2-liter five necked round-bottom flask equipped with a mechanical stirrer, thermometer, heating mantle, and condenser is placed the desired quantities of a diglycidyl ether of bisphenol A having an epoxide equivalent weight (EEW) of 188 to 189 and bisphenol A (see Table I). The mixture is heated to 100° C. and stirred under nitrogen atmosphere until dissolution of the bisphenol A had occurred. Ethyl triphenyl phosphonium acetate·acetic acid complex catalyst (0.08%) is then added and the temperature controller is adjusted to 150° C. Heating is continued until a temperature of 150° C. is reached. The mixture is allowed to exotherm and after peak temperature is reached, allowed to slowly cool to 150° C. Dibutyl tin dilaurate (T-12, ~0.08–0.04%) is added followed by phenyl isocyanate (dropwise) with stirring over the course of 15–20 minutes. After complete addition, the mixture is allowed to stir at 150° C. for ~30 minutes and then poured out onto aluminum foil. EEW, Mettler softening point, and melt viscosity are then determined. An infrared absorption (FTIR) spectrum is also obtained. The quantities of reactants and results are given in Table I.

TABLE I

| | Base Resin | | | Modified Resin | | | | |
|---|---|---|---|---|---|---|---|---|
| Exp. | DGEBA[a] gram | Bis A[b] gram | EEW | % Isocyanate[c] | OH Capped[d] | EEW | MSP[e] | V[f] |
| 1 | 723.4 | 276.6 | 695 | 9.9 | ½ | 774 | 104.8 | >4000 |
| 2 | 744.7 | 255.3 | 566 | 9.0 | ½ | 619 | 92.5 | 2080 |

TABLE I-continued

| | Base Resin | | | Modified Resin | | | | |
|---|---|---|---|---|---|---|---|---|
| Exp. | DGEBA[a] gram | Bis A[b] gram | EEW | % Isocyanate[c] | OH Capped[d] | EEW | MSP[e] | V[f] |
| 3 | 902.1 | 297.9 | 542 | 8.4 | ⅛ | 600 | 92.3 | 1680 |
| 4 | 297.7 | 98.3 | 557 | 15.4 | ⅝⁸ | 101.9 | 2960 | |
| 5 | 303.3 | 92.7 | 532 | 14.9 | ⅔ | 625 | 99.0 | 2720 |
| 6 | 902.1 | 297.9 | 556 | 4.4 | 1/6 | 582 | 88.6 | 1520 |
| 7[g] | 902.1 | 297.9 | — | 4.4 | 1/6 | 632 | 91.1 | 1960 |
| 8 | 910.5 | 300.6 | 547 | 2.2 | 1/12 | 560 | 85.1 | 1150[h] |

[a]Diglycidylether of bisphenol A, EEW = 188–189.
[b]Bisphenol A.
[c]Phenyl isocyanate, 98%.
[d]Theoretical ratio of hydroxyls capped to total hydroxyls available.
[e]Mettler softening point.
[f]ICI Cone and Plate viscosity (in centipoise) measured at 150 C.
[g]Phenyl isocyanate added to DER 331/Bis A solution prior to advancement.
[h]Viscosity was measured by Kinematic method and converted to ICI equivalent using ICI equivalent - Kinematic reading/0.7.

EXAMPLE 9

Preparation of Octadecyl Isocyanate Capped Resin

In a 2-liter five necked round-bottom flask equipped with a mechanical stirrer, thermometer, heating mantle, and condenser is placed 1000 g of a diglycidyl ether of bisphenol A having an EEW of 648. Under nitrogen atmosphere, the resin is heated to 150° C. over the course of 1.5 hours. Dibutyl tin dilaurate (0.3 ml) is added followed by the slow dripwise addition of octadecyl isocyanate. After 45 minutes, the addition is complete and the mixture is allowed to stir at 150° C. for an additional hour before being poured out onto aluminum foil. EEW, Mettler softening point, and melt viscosity are then determined (see Table II). A FTIR spectrum is also obtained.

TABLE II

| | Base Resin | | Modified Resin | | | | | |
|---|---|---|---|---|---|---|---|---|
| Exp. | | EEW | Isocyanate | % | OH Capped[a] | EEW | MSP[b] | V[c] |
| 9 | DGEBA[d] | 648 | Octadecyl | 5.0 | 1/14 | 682 | 81.7 | 1360 |
| 10 | DER 331/BIS A | 555 | Naphthyl | 4.4 | 1/9 | 581 | 88.0 | 1290[e] |
| 11 | DER 331/BIS A | 561 | Isopropyl | 3.2 | 1/6 | 580 | 86.1 | 1340[e] |

[a]Theoretical ratio of hydroxyls capped to total hydroxyls available.
[b]Mettler softening point.
[c]ICI Cone and Plate viscosity (in centipoise) measured at 150 C.
[d]Diglycidylether of bisphenol A.
[e]Viscosity was measured by Kinematic method and converted to ICI equivalent using ICI equivalent - Kinematic reading/0.7.

EXAMPLE 10

Preparation of Naphthyl Isocyanate Capped Resin

In a 2-liter five necked round-bottom flask equipped with a mechanical stirrer, thermometer, heating mantle, and condenser is placed 910.5 g of a diglycidyl ether of bisphenol A having an EEW of 189 and 300.67 g bisphenol A. The mixture is heated under nitrogen atmosphere to 100° C. and allowed to stir at that temperature until dissolution of all of the bisphenol A had occurred. Ethyl triphenyl phosphonium acetate·acetic acid complex catalyst (1.0 ml) is added and the mixture is heated to 150° C. with stirring. The heating mantel is shut off at 150° C. and the mixture is allowed to exotherm. After peak temperature (187° C.) is reached the molten resin is allowed to cool to 150° C. Dibutyl tin dilaurate (T-12, 0.5 ml) is added followed by the dropwise addition of naphthyl isocyanate (55.3 g) over the course of 7 minutes. The mixture is then allowed to stir at 150° C. for an additional 43 minutes, poured out onto aluminum foil, and analyzed as above.

EXAMPLE 11

Preparation of Isopropyl Isocyanate Capped Resin

In a 2-liter five necked round-bottom flask equipped as above is placed 451.1 g of a diglycidyl ether of bisphenol A having an EEW of 189 and 149.0 g bisphenol A. The mixture is heated with stirring under nitrogen atomosphere to 100° C. After complete dissolution of the bisphenol A, 0.5 ml ethyl triphenyl phosphonium acetate·acetic acid complex is added and the mixture heated to 150° C. The heating mantle is shut off at 150° C. and the mixture is allowed to exotherm. After reaching a peak temperature of 183° C., the mixture is allowed to cool to 105° C. Dibutyl tin dilaurate (T-12, 0.13 ml) is added. Isopropyl isocyanate (19.6 g) is then added dropwise over the course of 20 minutes. The reaction mixture's temperature is then slowly raised to 150° C. over about 20 minutes and the resin is then poured out onto aluminum foil. The resulting resin is analyzed by FTIR, Mettler softening point, EEW determination, and melt viscosity.

EXAMPLE 12

Preparation of para-t-Butyl Phenol End-capped Resin

In a 2-liter five necked flask equipped with a mechanical stirrer, thermometer, heating mantle, and condenser is placed 1200.0 g of a diglycidyl ether of bisphenol A having an EEW of 530. The resin is heated under nitrogen atmosphere to a temperature of 150° C. and 57.2 g para-t-Butyl phenol is then added with stirring. Ethyl triphenyl phosphonium acetate·acetic acid complex catalyst (0.2 ml) is added and the mixture is allowed to stir for 10 minutes. EEW is then determined. Phenyl isocyanate (57.2 g) is added over the course of 12 minutes. After complete addition, the mixture is slowly heated to 170° C. and then pour out onto aluminum foil. The resulting resin is analyzed by the methods used in the above examples (see Table III).

TABLE III

| | Base Resin | | | Modified Resin | | | | |
|---|---|---|---|---|---|---|---|---|
| Exp. | DGEBA[a] | Capping Agent | % | % Isocyanate | OH Capped[b] | EEW | MSP[c] | V[d] |
| 12 | DER 331/BIS A | T-Butyl Phenol | 4.4 | 4.4 | 1/6 | 686 | 88.7 | 1480 |
| 13 | DER 331/BIS A | Nonyl Phenol | 4.4 | 4.4 | 1/6 | 654 | 85.4 | 1240 |

[a]Diglycidylether of bisphenol A, EEW - 530.
[b]Theoretical ratio of hydroxyls capped to total hydroxyls available.
[c]Mettler softening point.
[d]ICI Cone and Plate viscosity (in centipoise) measured at 150° C.

EXAMPLE 13

Preparation of Nonyl Phenol End-capped Resin

Nonyl phenol end-capped resin is prepared using the procedure employed for the preparation of para-t-Butyl phenol capped resin described above in Example 12. The resulting resin is also analyzed in the same manner.

EXAMPLE 14

A powder coating is prepared from the resin disclosed in Example 3. Example 3 resin (21.7 wt. %), SCADO TM P2610 (36.8 wt.%, a carboxyl functional polyester resin), Titanium dioxide (40.0 weight %, a filter and pigment), Benzoin (0.7 weight %, a leveling aid), and ACRYLRON TM MFP(0.8 weight %, a flow modifier) are weighed out and dry blended. The mixture is then melt mixed using a Buss Condux PLK 46 single screw extruder, operated at 120 rpm with Zone 1 set at 70° C. and Zone 2 set at 110° C. The extrudate is passed through BCI Chill Rolls, cooled, and crushed. The crushed extrudate is then ground into a fine powder using a Brinkman Centrifugal Grinding Mill utilizing the 24 tooth grinding attachement and classified by seiving through No. 140 (150 mesh) 106 micron or less standard sieve (wire cloth). The powder coating is then applied via electrostatic spray with a Gema Ag Type 710 Laboratory Unit (set at 60–70 kV) on to 4"×12"×20 gauge (101.6 mm×304.8 mm×0.89 mm) cold rolled steel, clean treatment, Parker test panels. The powder coated panels are then cured at 180° C. for 30 minutes in a Blue M Touchmatic convection oven. After removal from the oven, the panels are allowed to cool and the coating properties evaluated. The powder coating thus produced has equivalent coating properties with superior smoothness as compared to a similar powder coating made from standard epoxy resin (See Example 16). Coating evaluation data is found in Table IV.

TABLE IV

| | Example | | |
|---|---|---|---|
| Test | 14 | 15 | 16 |
| Impact (F/R) | 160/160 | 160/160 | 160/160 |
| Gloss (20°/60°) | 76/92 | 69/90 | 70/92 |
| Pill Flow[a] | 39 | 27 | 34 |
| Gel Time (sec.)[b] | 144 | 157 | 160 |
| Pencil Hardness | F | F | F |

[a]0.75 g pill (6 mm × 12 mm diameter) inclined at 60° in 300° F. oven for 15 minutes.
[b]Gel time at 180° C.

EXAMPLE 15

A powder coating is prepared using the method described in Example 14 with the following change in ingredients. A portion of the resin prepared in Example 3 (18 weight %), Scado 2610 (30.5 weight %), Titanium dioxide (50 weight %), Benzoin (0.7 weight %), Acrylron MFP (0.8 weight %). The coating produced from this powder gave good physical properties and an appearance equivalent to a similar powder coating made from standard epoxy resin. Coating evaluation data is found in Table IV.

EXAMPLE 16

A powder coating is prepared using the method described in Example 14 with the following change in ingredients. A diglycidyl ether of bisphenol A having an EEW of 700 (23.4 weight %), Scado 2610 (35.1 weight %), Titanium dioxide (40 weight %), Benzoin (0.7 weight %), Acrylron MFP (0.8 weight %). Coating evaluation data for this powder coating is found in Table IV.

EXAMPLE 17

This example is provided to illustrate the difference between a modified resin and an unmodified resin in terms of softening point and melt viscosity. A diglycidyl ether of bisphenol A having an EEW of 189 (723.4 g) and bisphenol A (276.6 g) are mixed and allowed to stir at 100° C. until dissolution of the Bisphenol A has occured. Ethyl triphenyl phosphonium acetate·acetic acid complex (1 ml) is added and the mixture is heated to 150° C. At this temperature the heating is discontinued and the resin is allowed to exotherm. After cooling to 150° C., the resin is poured onto an aluminum foil pan and after cooling, its properties are determined. The resin has a Mettler softening point of 92.4° C., an EEW of 695, and a melt viscosity (ICI Cone & Plate, 150° C.) of 2970 cps (2.97 Pa·s). This resin can be compared to Examples 2, 3 and 7.

What is claimed is:

1. In an epoxy resin which has secondary aliphatic hydroxyl groups along its backbone; the improvement which comprises reacting at least a portion of the secondary aliphatic hydroxyl groups with at least one monoisocyanate selected from (a) at least one aliphatic monoisocyanate, (b) at least one aliphatic monoisothiocyanate (c) at least one aromatic monoisocyante, (d) at least one aromatic monoisothiocyanate or (e) any combination thereof and wherein said epoxy resin has been prepared by reacting (A) an epoxy resin represented by the following Formulas I, II, III or IV or any combination thereof

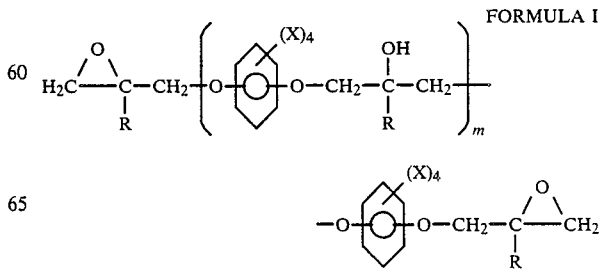

FORMULA I

FORMULA II

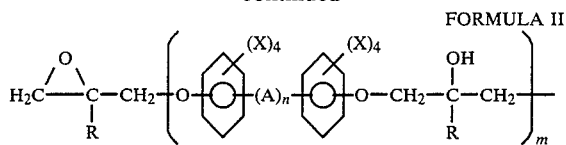

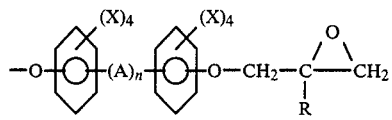

FORMULA III

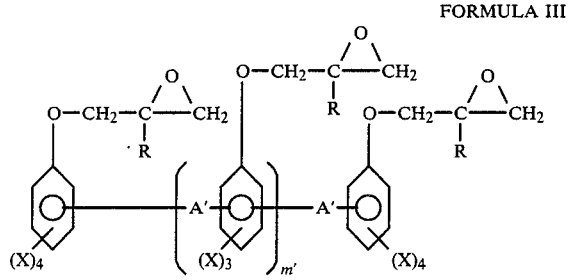

FORMULA IV

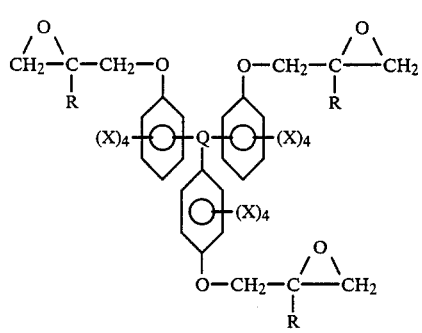

wherein each A is independently a divalent hydrocarbon group having from 1 to about 10 carbon atoms, —O—, —S—, —S—S—, —SO—, —SO$_2$— or —CO—; Q is a trivalent hydrocarbon group having from 1 to about 10 carbon atoms; each A' is independently hydrogen or a hydrocarbon group having from 1 to about 10; each R is independently hydrogen or an alkyl group having from 1 to about 4 carbon atoms; each X is independently hydrogen, a hydrocarbyl or hydrocarbyloxy group having from 1 to about 10 carbon atoms, bromine, chlorine or fluorine; m has an average value of from zero to about 2; m' has an average value from about 0.001 to about 5; and n has a value of zero or 1; with (B) an organic compound having an average of about 2 aromatic hydroxyl groups per molecule represented by the following formulas (V) or (VI) or any combination thereof

FORMULA V

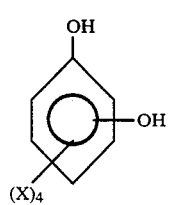

FORMULA VI

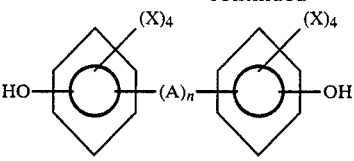

wherein each A and X is as defined above; and wherein components (A) and (B) are employed in quantities which provide a ratio of phenolic hydroxyl groups to epoxy groups of from about 0.1:1 to about 0.9:1.

2. An epoxy resin of claim 1 wherein each A is a divalent hydrocarbon group having from 1 to about 6 carbon atoms; each A' is a hydrocarbon group having from 1 to about 4 carbon atoms; Q has 1 carbon atom; each R is hydrogen; each X is hydrogen, methyl or bromine; m has an average value from 0.001 to about 1; m' has an average value from about 0.001 to about 3; n has a value of 1; and wherein components (A) and (B) are employed in quantities which provide a ratio of phenolic hydroxyl groups to epoxy groups of from about 0.3:1 to about 0.7:1.

3. An epoxy resin of claim 2 wherein component (A) is a diglycidyl ether of bisphenol A; component (B) is bisphenol A; and components (A) and (B) are employed in quantities which provide a ratio of phenolic hydroxyl groups to epoxy groups of from about 0.4:1 to about 0.6:1.

4. An epoxy resin of claim 1 wherein said epoxy resin having secondary aliphatic hydroxyl groups along its backbone is an epoxy resin represented by formulas I or II or a combination thereof wherein each A is independently a divalent hydrocarbon group having from 1 to about 10 carbon atoms, —O—, —S—, —S—S—, —SO—, —SO$_2$— or —CO—; each R is independently hydrogen or an alkyl group having from 1 to about 4 carbon atoms; each X is independently hydrogen, a hydrocarbyl or hydrocarbyloxy group having from 1 to about 10 carbon atoms, bromine, chlorine or fluorine; m has an average value of from about 2 to about 15; and n has a value of zero or 1.

5. An epoxy resin of claim 4 wherein each A is independently a divalent hydrocarbon group having from 1 to about 6 carbon atoms; each X is independently hydrogen, methyl or bromine; m has an average value of from about 2 to about 10; and n has a value of 1.

6. An epoxy resin of claim 5 wherein said epoxy resin is represented by Formula II wherein A is an isopropylidine group; each X is hydrogen; and m has an average value of from about 3 to about 6.

7. An epoxy resin of claim 1, 2, 3, 4, 5 or 6 wherein said organic monoisocyanate is represented by the following Formulas VII, VIII or IX:

FORMULA VII

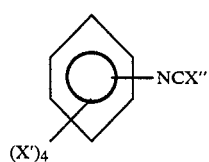

-continued

FORMULA VII

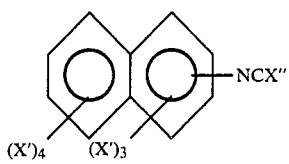

FORMULA IX

R'—NCX"

wherein R' is an alkyl group having from 1 to about 20 carbon atoms; each X' is independently hydrogen, a hydrocarbyl, hydrocarbyloxy, aminoalkyl or thioalkyl group having from 1 to about 10 carbon atoms, a nitro group, bromine, chlorine or fluorine; and X" is an oxygen atom or a sulfur atom; and wherein said organic monoisocyanate is employed in an amount corresponding to the amount theoretically required to react with from about 8 to about 70 percent of the theoretical amount of secondary aliphatic hydroxyl groups present in said epoxy resin.

8. An epoxy resin of claim 7 wherein said organic monoisocyanate is represented by Formulas VII or IX wherein R" has from about 3 to about 8 carbon atoms and X" is oxygen.

9. An epoxy resin represented by the following Formulas XI and XII:

FORMULA XI

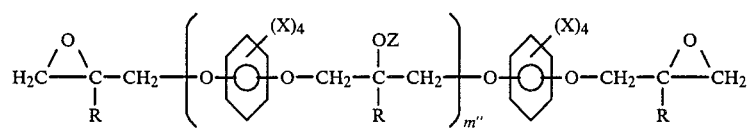

FORMULA XII

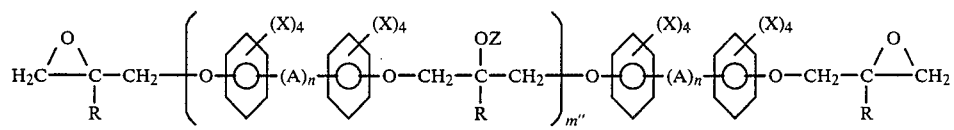

wherein each A is independently a divalent hydrocarbon group having from 1 to about 10 carbon atoms, —O—, —S—, —S—S—, —SO—, —SO$_2$—, —CX'$_2$— or —CO—; Q is a trivalent hydrocarbon group having from 1 to about 10 carbon atoms; each A' is independently hydrogen or a hydrocarbon group having from 1 to about 10; each R is independently hydrogen or an alkyl group having from 1 to about 4 carbon atoms; each X is independently hydrogen, a hydrocarbyl or hydrocarbyloxy group having from 1 to about 10 carbon atoms, bromine, chlorine or fluorine; m" has an average value of from about 2 to about 10; and n has a value of zero or 1; and each Z is independently a hydroxyl group or the group represented by the following Formulas XIII, XIV and XV:

FORMULA XIII

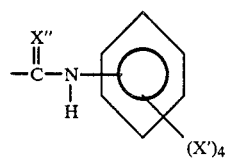

-continued

FORMULA XIV

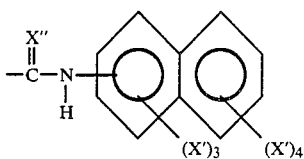

FORMULA XV

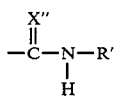

wherein R' is an alkyl group having from 1 to about 20 carbon atoms; each X' is independently hydrogen, a hydrocarbyl, hydrocarbyloxy, aminoalkyl or thioalkyl group having from 1 to about 10 carbon atoms, a nitro group, bromine, chlorine or fluorine; X" is an oxygen atom or a sulfur atom; and each Z is independently a hydrogen group or the group represented by the following formulas XIII, XIV and XV:

FORMULA XIII

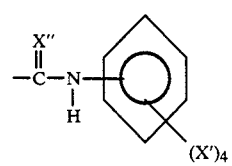

FORMULA XIV

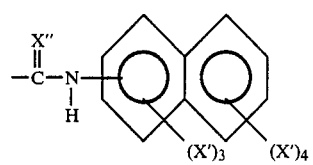

FORMULA XV

-C-N-R'
 ||  |
 X" H wherein each R' and X' is as previously defined; and wherein from about 8 to about 70 percent of the Z groups are represented by Formula XIII, XIV or XV.

10. An epoxy resin of claim 9 wherein each A is a divalent hydrocarbon group having from 1 to about 6 carbon atoms; each R is hydrogen; each R' is an alkyl group having from about 3 to about 8 carbon atoms; each X is hydrogen, methyl or bromine; each X" is oxygen; m" has an average value from about 3 to about 6; and n has a value of 1.

11. An epoxy resin of claim 10 wherein each A is an isopropylidine group; each X is hydrogen and each X' is hydrogen.

12. A curable composition which comprises (A) at least one epoxy resin of claim 1, 2, 3, 4, 5, 6, 9, 10 or 11; and (B) a curing quantity of at least one curing agent for component (A).

13. A curable composition of claim 12 wherein said curing agent is a primary aliphatic polyamine, a secondary aliphatic polyamine, tertiary amine, carboxylic acid or carboxylic acid anhydride, phenolic hydroxyl-containing compound, guanidine, biguanide, urea-aldehyde resin, melamine-aldehyde resin, aromatic polyamine, sulfanilamide, phosphate acid, phosphate ester, phosphite, Lewis acid or a combination thereof.

14. A curable composition which comprises (A) at least one epoxy resin of claim 7; and (B) a curing quantity of at least one curing agent for component (A).

15. A curable composition of claim 14 wherein said curing agent is selected from guanidines; biguanides; polyamides; imidazoles; adducted imidazoles copolymers of acrylic and/or methacrylic acid with at least one other polymerizable ethylenically unsaturated monomer.

16. A curable composition of claim 15 wherein said curing agent is dicyandiamide, methylenedianiline, diaminodiphenylsulfone, phenolic hydroxyl-containing compound, 2-methylimidazole, 2-phenylimidazole, adducted imidazole or a combination thereof 17. A curable composition which comprises (A) at least one epoxy resin of claim 8; and (B) a curing quantity of at least one curing agent for component (A).

18. A curable composition of claim 17 wherein said curing agent is a carboxy functional polyester resin.

19. A coating composition comprising the curable composition of claim 12 and at least one additive selected from the group consisting of solvents or diluents, fillers, pigments, dyes, flow modifiers, thickeners, leveling agents, extenders, reinforcing agents, antistatic agents, or fluidizing agents.

20. A coating composition comprising the curable composition of claim 13 and at least one additive selected from the group consisting of solvents or diluents, fillers, pigments, dyes, flow modifiers, thickeners, leveling agents, extenders, reinforcing agents, antistatic agents, or fluidizing agents.

21. A coating composition comprising the curable composition of claim 14 and at least one additive selected from the group consisting of solvents or diluents, fillers, pigments, dyes, flow modifiers, thickeners, leveling agents, extenders, reinforcing agents, antistatic agents, or fluidizing agents.

22. A coating composition comprising the curable composition of claim 15 and at least one additive selected from the group consisting of solvents or diluents, fillers, pigments, dyes, flow modifiers, thickeners, leveling agents, extenders, reinforcing agents, antistatic agents, or fluidizing agents.

23. A coating composition comprising the curable composition of claim 16 and at least one additive selected from the group consisting of solvents or diluents, fillers, pigments, dyes, flow modifiers, thickeners, leveling agents, extenders, reinforcing agents, antistatic agents, curing agent catalysts or fluidizing aids.

24. A coating composition comprising the curable composition of claim 17 and at least one additive selected from the group consisting of solvents or diluents, fillers, pigments, dyes, flow modifiers, thickeners, leveling agents, extenders, reinforcing agents, antistatic agents, or fluidizing aids.

25. A coating composition comprising the curable composition of claim 18 and at least one additive selected from the group consisting of solvents or diluents, fillers, pigments, dyes, flow modifiers, thickeners, leveling agents, extenders, reinforcing agents, antistatic agents, or fluidizing aids.

* * * * *

UNITED STATES PATENT AND TRADEMARK OFFICE
CERTIFICATE OF CORRECTION

PATENT NO. : 4,801,662

DATED : January 31, 1989

INVENTOR(S) : Gordon C. Fischer

It is certified that error appears in the above-identified patent and that said Letters Patent is hereby corrected as shown below:

Col. 1, line 58; change "aliphtic" to --aliphatic--.

Col. 6, line 36; change "hydbrid" to --hybrid--.

Col. 7, line 22; change " "m" " to -- m" --.

Col. 7, line 45; change "functinal" to --functional--.

Col. 9, Table I continued, for Exp. 4; bring the tabs over one tab beginning at "OH Capped$^d$" heading - it should be as follows:

-- OH Capped$^d$    EEW    MSP$^e$    V$^f$    --

2/3        658    101.9    2960

Col. 11, line 24; change "filter" to --filler--.

Col. 11, line 33; change "attachement" to --attachment--.

Col. 15, line 2; change "Formula VII" to --Formula VIII--.

Signed and Sealed this

Sixteenth Day of January, 1990

*Attest:*

JEFFREY M. SAMUELS

*Attesting Officer*      *Acting Commissioner of Patents and Trademarks*